(12) United States Patent
Ireland

(10) Patent No.: US 6,206,950 B1
(45) Date of Patent: *Mar. 27, 2001

(54) PROCESS FOR RECOVERY OF ALUMINUM USING HIGH PURITY SALT ALUMINUM FLUX

(75) Inventor: Donald T. Ireland, Delano, MN (US)

(73) Assignee: Cargill, Incorporated, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/182,163

(22) Filed: Oct. 29, 1998

(51) Int. Cl.[7] .................................................. C22B 21/00
(52) U.S. Cl. ................................. 75/687; 75/685; 75/309
(58) Field of Search .............................. 75/308, 315, 671, 75/672, 686, 687, 309, 685

(56) References Cited

U.S. PATENT DOCUMENTS

| 3,840,651 | 10/1974 | Ireland | 423/499 |
| 4,761,207 | 8/1988 | Stewart, Jr. et al. | 204/67 |
| 4,983,216 | * 1/1991 | Van Linden et al. | 75/672 |
| 5,405,427 | 4/1995 | Eckert | 75/308 |
| 5,762,722 | * 6/1998 | Zhang | 148/26 |
| 6,053,959 | * 4/2000 | Ireland | 75/309 |

FOREIGN PATENT DOCUMENTS

| 1661235 A1 | 7/1991 | (RU) . | |
| 1661235 | * 7/1991 | (RU) | 75/309 |
| 0667604 | * 6/1979 | (SU) . | |

OTHER PUBLICATIONS

CA 118:25336—Hantelmann, H., "Complete Treatment of Aluminum Salt Slags", Tsvetn. Met. (Moscow) (1992) (6), 63–4.

Pedersen, et al., "Refining and Alloying of Aluminum by Injection", Light Metals, 1986, pp. 759–765.

Revet, Annette, "Solution Mined Chlorides as a New Source of Aluminum Flux Ingredients", Third Internaitonal Symposium on Recycling of Metals and Engineered Materials, Edited by P.B. Queneau & R.D. Peterson, The Minerals, Metals & Materials Society, 1995, pp. 243–250.

Shell, et al., "Aluminum Dross Treatment Using Salt Fluxes", pp. 133–146, Alum. Cast House Tech. Australas., Asian Pac. Conf., 4th, 1995, Published The Minerals, Metals & Materials Society.

Sorrell, et al., "Aluminum Fluxing Salts: A Critical Review of the Chemistry and Structures of Alkali Aluminum Halides", Information Circular 9069, United States Department of the Interior, Bureau of Mines, 1986, pp. 1–37.

Tenorio, et al., "Effect of the Saline Flux Composition on the Recycling of UBC and Aluminum Chips", Int. Conf. Recycl. Met., Proc., 2nd (1994) pp. 419–425.

Van Linden, et al., "Molten Salt Flux Composition Effects in Aluminum Scrap Remelting", Light Met., 1988, pp. 391–398.

Wojciechowski, Jr., et al., "UBC Flux Optimization at Imsamet, Inc. Aluminum Smelter", The Minerals, Metals & Materials Society, pp. 1297–1299, 1995.

Ye, et al., "Role of Molten Salt Flux in Melting of Used Beverage Container (UBC) Scrap", Third International Symposium on Recycling of Metals and Engineered Materials, Edited by P.B. Queneau & R.D. Peterson, The Minerals, Metals & Materials Society, 1995, pp. 639–649.

Narayanan, et al., "Metal Loss in Remelting of Aluminum Alloys in Molten Salt Fluxes", Light Metals, 1995, Edited by J. Evans, The Minerals, Metals & Materials Society, pp. 803–807.

Utigard, et al., "Thermodynamic Behavior of Magnesium During Refined and Fluxing Aluminum", Light Met. Process. Appl., Proc. Int. Symp. (1993), pp. 383–395.

Burkin, A.R. (Ed), "Production of Aluminum and Alumina", Critical Reports on Applied Chemistry vol. 20, Published John Wiley & Sons, pp. 208–213.

* cited by examiner

*Primary Examiner*—Melvyn Andrews
(74) *Attorney, Agent, or Firm*—Fitch, Even, Tabin & Flannery

(57) ABSTRACT

A salt flux composition comprising a high purity salt and additives is used in the recycle of scrap aluminum to increase the recovery of aluminum. The additives include an alkaline agent and a fluoride source.

20 Claims, No Drawings

PROCESS FOR RECOVERY OF ALUMINUM USING HIGH PURITY SALT ALUMINUM FLUX

FIELD OF THE INVENTION

This invention provides a composition and method of using that composition in the recycle of aluminum, especially scrap aluminum such as found in used beverage containers. More particularly, this invention relates to a high purity salt flux composition and additive composition for use with a high purity salt for making the high purity salt flux composition, which salt flux composition can be used during the remelting of scrap aluminum. The method of the invention is directed to using the high purity salt flux composition during the aluminum recovery process to improve coalescence of the molten aluminum.

BACKGROUND OF THE INVENTION

Use of molten salt fluxes in the secondary aluminum industry is known to improve direct recovery of aluminum in remelting processes. Aluminum and scrap aluminum, such as used beverage containers (UBCs), are treated using such processes. Remelting of the aluminum in a furnace is carried out under cover of a layer of molten salt to prevent oxidation of the aluminum in the furnace atmosphere and to promote coalescence of the molten aluminum so as to maximize recovery of aluminum. During processing, an oxide film tends to form on the surface of the molten aluminum droplets. The oxide film inhibits coalescence of the molten aluminum, causing smaller particles to be lost in the process thereby reducing the amount of aluminum recovered. The unrecoverable aluminum droplets having the oxide film are sometimes referred to as dross.

Use of a salt flux in the furnace helps to strip away and suspend the oxide film so that coalescence of the droplets increases and dross formation decreases. The salt flux wets the oxide film and initiates disintegration of the film, stripping it from the surface of the molten aluminum droplets. Fragments of the oxide film stripped from the aluminum remain suspended in the flux. The aluminum droplets, which have a density greater than the flux, then form a continuous molten pad beneath the flux layer. The flux also prevents further oxide formation by keeping the metal protected from the atmosphere of the furnace.

One type of salt flux is primarily composed of a mixture of high purity sodium chloride and potassium chloride. The high purity salts used in such processes are solution mined and purified by complex, highly developed methods.

An object of this invention is to provide for improved aluminum recovery in a recycle process which includes scrap aluminum and salt flux.

Another object of the invention is to provide for improved coalescence of the molten aluminum in a process which includes melting scrap aluminum with a high purity salt flux composition, especially aluminum from UBCs.

Yet another object of the invention is to use an additive with a high purity salt flux composition, which additive includes an alkaline agent and a fluoride source to increase the coalescence of the remelted molten aluminum, thereby improving recovery of the metal.

Further objects and advantages of the invention will be found by reference to the following specification.

SUMMARY OF THE INVENTION

The present invention is directed to a method and composition for increasing aluminum recovery in the recycle of aluminum, and in an important aspect, scrap aluminum such as aluminum from used beverage containers (UBCs). The salt flux composition of the invention protects the molten aluminum from oxidation, strips a protective oxide film from the molten aluminum so that molten aluminum droplets can coalescence and holds the oxide film in suspension so that the molten aluminum can be recovered.

Broadly, the salt flux composition of the invention comprises high purity NaCl and/or KCl, an alkaline agent and a fluoride source. The amounts of alkaline agent and fluoride source, along with the high purity NaCl and/or KCl, are effective for improving coalescence and reducing aluminum loss in the recovery of aluminum from molten scrap aluminum, where the improvement is relative to a salt flux composition which comprises a high purity salt without an alkaline agent and a fluoride source.

In an important aspect, the invention includes a salt flux composition which comprises high purity NaCl and/or KCl, an alkaline agent and a fluoride source, where the amounts of the alkaline agent and fluoride source, along with a high purity salt in the salt flux composition, are effective for improving coalescence and reducing aluminum loss in the recovery of aluminum from molten scrap aluminum, especially UBCs which comprise specific alloys of aluminum. Such an improvement is relative to a process using like conditions and a high purity salt flux composition consisting essentially of a high purity salt without the alkaline agent and fluoride source. Generally, the salt flux composition comprises at least about 0.2 weight percent and preferably from about 0.2 to about 3 weight percent alkaline agent and at least about 3 and preferably from about 3 to about 7 weight percent fluoride source, all based upon the weight of the salt flux composition. Generally, the salt flux composition comprises from about 90 to about 96.8 weight percent NaCl and/or KCl in this aspect of the invention.

The high purity salt flux will have less than about 0.2 weight percent sulfate. The composition and process of the invention also will at least maintain or improve aluminum coalescence as compared to a process using a salt flux consisting essentially of a high purity alkali metal salt such as NaCl and/or KCl.

In another aspect, the invention is directed to an additive composition which consists essentially of an alkaline agent and fluoride source for addition to high purity NaCl and/or KCl to provide a high purity salt flux composition which improves aluminum coalescence in a process which involves mixing scrap aluminum metal, the additive and high purity salt to recover aluminum, as opposed to a process in which aluminum is recovered from dross resulting from previous aluminum processes without the further addition of scrap aluminum.

In an important aspect, the alkaline agent is selected from the group consisting of $Na_2CO_3$, NaOH, KOH, $K_2CO_3$ and mixtures thereof and the fluoride source is selected from the group consisting of MF, $CaF_2$, $MAlF_4$, $M_3AlF_6$ and mixtures thereof, where M is K or Na.

In another important aspect, the additive composition comprises alkaline agent in an amount of from about 3 to about 50 weight percent and fluoride source in an amount of from about 50 to about 97 weight percent, each based upon the weight of the additive composition. In another important aspect, the additive composition comprises between about 4 to about 10 weight percent of the salt flux composition.

The salt flux composition of the invention generally is used in the process of the invention at a level of at least about 1 weight percent, based upon the weight of aluminum being processed.

DETAILED DESCRIPTION OF THE INVENTION

Definitions

As used herein, "scrap aluminum" means aluminum stock left over from equipment or structural manufacture or used beverage cans.

As used herein, scrap aluminum from UBCs includes 3003 aluminum alloy, 3004 alloy and 5182 alloy.

As used herein, a "standard purity salt" means sodium chloride having at least about 0.3 weight percent sulfate or potassium chloride having at least about 0.02 weight percent sulfate, and a "high purity salt" means sodium chloride having less than about 0.2 weight percent sulfate or potassium chloride having less than about 0.01 weight percent sulfate.

As used herein, "high purity salt flux composition" or "high purity salt flux" means a flux composition which comprises a high purity sodium or potassium chloride or a mixture thereof. A high purity flux composition has at least about the same or a lesser amount of sulfate than which is in high purity NaCl, KCl or blends thereof, which is used in the high purity flux composition.

As used herein, "additive composition" means a composition which comprises an alkaline agent and a fluoride source for use with an alkali metal salt to provide a salt flux composition which may be used in the recovery of aluminum from scrap aluminum.

As used herein, "dross" means the formation of unrecoverable aluminum droplets having an oxide film covering the outer surface which are entrapped within the salt flux layer in the furnace.

As used herein, "recovery yield" means the yield of recovered aluminum metal from a recycling process where aluminum metal scrap is mixed with a high purity salt flux composition and where the yield of recovered aluminum is based upon the weight of the aluminum which is put into the process as a starting material.

Salt Flux Composition

The invention provides a method and compositions for enhanced aluminum recovery when scrap aluminum is mixed with the high purity salt and additive and the blend is processed for recycle. The invention provides a high purity salt flux composition, which comprises high purity NaCl and/or KCl, an alkaline agent and a fluoride source, to be used in a furnace during the recycle of aluminum, especially scrap aluminum such as found in used beverage containers (UBCs). The salt flux composition of the invention is melted along with scrap aluminum, which is not aluminum which is part of a dross blend, to provide a molten mixture in the furnace, wherein the salt flux composition promotes the coalescence of the molten aluminum droplets and prevents oxidation of the aluminum so as to increase the recovery yield of aluminum from the recycle process.

In an important aspect, the salt flux composition consists essentially of high purity salt, alkaline agent and fluoride source which flux composition is mixed with scrap aluminum from UBCs comprising alloys of aluminum, such as 3003, 3004 or 5182 aluminum alloys which aluminum is not a part of any dross blend from previous aluminum processing. The UBCs also may contain up to about 2% magnesium.

In its broadest aspect, the salt flux composition of the invention comprises high purity NaCl and/or KCl, an alkaline agent and a fluoride source. The amounts of alkaline agent and fluoride source, along with the high purity NaCl and/or KCl, are effective for improving coalescence and reducing aluminum loss in the recovery of aluminum from molten scrap aluminum, where the improvement is relative to a salt flux composition which comprises a high purity salt without an alkaline agent and a fluoride source. Generally, in this aspect, the salt flux composition comprises at least about 0.2 weight percent and preferably from about 0.2 to about 3 weight percent alkaline agent and at least about 3 and preferably from about 3 to about 7 weight percent fluoride source, all based upon the weight of the salt flux composition. Generally, the salt flux composition comprises from about 90 to about 96.8 weight percent NaCl and/or KCl in this aspect of the invention.

When a mixture of high purity salts is used, the ratio of NaCl to KCl is from about 30:70 to 70:30. Preferably an essentially equimolar mixture of high purity NaCl and KCl is used in the high purity salt flux to provide a lower melting temperature for the high purity salt flux composition, as well as to lower the cost of the salt flux. More particularly, it is desirable to provide a mixture of high purity salts having a composition at or near the eutectic point of the NaCl and KCl blend so as to minimize melting temperature. It is possible, however, to use only NaCl or KCl with similar recovery results. Of course, the presence of the alkaline agent and fluoride source in the salt flux composition also will affect the melting temperature of the salt flux composition. The melting point of the eutectic mixture of high purity salts is about 750° C.

The additive composition of the invention is added to a high purity salt to provide the salt flux composition of the invention. The additive composition comprises an alkaline agent and fluoride source in amounts effective for increasing the recovery yield of aluminum during recycle when the additive composition is added to a high purity alkali metal salt. In an important aspect the additive consists essentially of the alkaline agent and fluoride source and the salt flux composition consists essentially of the high purity salt (NaCl and/or KCl), the alkaline agent and fluoride source. The additive composition comprises at least about 4 weight percent of the high purity salt flux composition and preferably between about 4 to about 10 weight percent.

The alkaline agent may be either high or low bulk density soda ash, $K_2CO_3$, NaOH or KOH. Preferably, the alkaline agent is soda ash. Preferably, the alkaline agent is added in an amount between about 0.2 to about 3% based on the weight of the salt flux composition, although use of an amount greater than about 2% provides only a limited increase in benefit.

While not intending to be bound by any theory, the alkaline agent increases coalescence of the molten aluminum, even as compared to certain salt fluxes comprising high purity salts. Another benefit associated with the alkaline agent is that it promotes the formation of the non-reactive forms, CaO and MgO.

The fluoride source may be KF, NaF, $CaF_2$, $Na_3AlF_6$ (cryolite), $K_3AlF_6$, $NaAlF_4$ (SATF), $KAlF_4$ or mixtures thereof. Preferably, it is cryolite or SATF. While not intending to be bound by any theory, a fluoride source in the additive composition improves coalescence of the molten aluminum by increasing the dissolution of the oxide film on the molten aluminum droplets. The fluoride source is in an amount effective for improving coalescence of the molten aluminum. Preferably, the fluoride source is present in an amount between about 3% to about 7% based on the weight of the salt flux composition. Addition of a fluoride source and/or the alkaline agent to the high purity salt flux also may reduce the melting temperature of the high purity flux composition.

Method of the Invention

The method of the invention is directed to enhanced recovery of aluminum in a remelting process. If UBCs are to be recycled, pre-processing includes the mechanical shredding of the UBCs into strips of about 12 inches long and about ½ to about 1 inch wide. If other forms of aluminum are to be processed according to the method of the invention, they should be pre-processed, if necessary, to provide similarly sized particles. Preferably, the aluminum also is delacquered, if necessary. Any method known to one skilled in the art can be used to shred and to delacquer the aluminum in preparation for the remelting process.

Preferably, the components of the salt flux composition of the invention or a high purity salt and the additive are combined to form a dry mixture prior to being charged to a furnace. The salt flux composition then is charged to the furnace, such as a vertical muffle or rotary furnace or other suitable, commercially available furnace, for melting either prior to or concurrently with addition of the aluminum. The furnace should have as its melting zone a container that is relatively inert to the molten salt flux so that impurities are not introduced into the flux composition from the container. The temperature of the furnace is held between about 750° C. and about 800° C. The salt flux composition is melted at from about 740° C. to about 750° C. and may be held in the molten state for about 300 minutes. Preferably, a reducing atmosphere is maintained in the furnace to reduce oxidation of aluminum to aluminum oxide.

The shredded scrap metal then is added to the molten salt flux composition in the furnace as a batch process. The purified aluminum which has coalesced beneath the salt flux layer is decanted from the furnace after approximately 30 minutes. Generally, the recovery yield of aluminum decreases the longer the aluminum remains in the furnace. The process also may be modified for continuous processing of the scrap aluminum.

The amount of flux composition used in the furnace is at least about 1 weight percent and, in an important aspect, is from about 1% to about 50%, based upon the weight of aluminum. Preferably, the amount of flux used in the process is from about 2% to about 5% based upon the weight of the aluminum. With each batch of aluminum processed, fragments of oxide film, particles of aluminum coated with the oxide film and other impurities become entrapped in the flux composition layer, causing it to become more cloudy and viscous. The salt flux composition may be re-used in the furnace until the flux composition becomes too viscous, which makes it difficult to remove purified aluminum. Generally, the salt flux composition may be re-used approximately 6 times. After the initial charge of salt flux composition, an amount of flux composition is added to the furnace along with each batch of aluminum for each re-use of the flux composition. Approximately 5% to 15% of the total weight of flux composition initially charged to the furnace is added with each subsequent batch of aluminum.

The following example illustrates a method for carrying out the invention and should be understood to be illustrative of, but not limiting upon, the scope of the invention which is defined in the appended claims.

EXAMPLE 1

Various flux compositions, as described below in Table 1, were tested in duplicate in this experiment. Compositions 1 and 2 were included in the experiment as control compositions. Compositions 3–6 relate to the invention. In all compositions, the fluoride source was SATF, the carbon source was coal and the alkaline agent was soda ash. SATF was added to the salt flux composition in an amount of about 5 weight percent, based on the weight of the salt flux composition. Soda ash, when used, was added to the salt flux composition in an amount of about 1 weight percent, based on the weight of the salt flux composition.

TABLE 1

| Composition | Components |
| --- | --- |
| 1 | High Purity Salt + Fluoride Source |
| 2 | High Purity Salt + Fluoride Source |
| 3 | High Purity Salt + Fluoride Source + Carbon Source + Alkaline Agent |
| 4 | High Purity Salt + Fluoride Source + Carbon Source + Alkaline Agent |
| 5 | High Purity Salt + Fluoride Source + Alkaline Agent |
| 6 | High Purity Salt + Fluoride Source + Alkaline Agent |

Forty-five grams of flux composition was heated in a crucible and allowed to melt for 20 minutes. After 20 minutes, 2.25 grams of delacquered, shredded aluminum beverage cans was added to the molten flux. The flux with aluminum was maintained in a molten state at 800° C. for one hour without agitation. The crucible was inclined at a 20° slope from the horizontal to bring the molten aluminum drops into contact with one another. The crucible then was cooled to room temperature. Water soluble material was removed by dissolving in water. The remaining water insoluble materials, including aluminum, were dried. The aluminum particles were removed.

A visual inspection of the recovered aluminum revealed that coalescence is improved with a salt flux composition comprising high purity salt, an alkaline agent and fluoride source as compared to a high purity salt flux composition without the additive. The use of a carbon source in the salt flux composition provides no visible improvement to coalescence when a high purity salt flux composition with alkaline agent and fluoride source is used.

What is claimed is:

1. A process for the recovery of aluminum from scrap aluminum and to increase the coalescence of molten aluminum during the process, the process comprising:

mixing the scrap aluminum in a solid or molten form and a salt flux composition in a solid or molten form and heating solids if they are present to provide a molten mixture, the salt flux composition comprising:

at least about 90 weight percent, based upon the weight of the salt flux composition, of a high purity alkali metal salt selected from the group consisting of NaCl, KCl and mixtures thereof;

from about 0.2 to about 3 weight percent, based upon the weight of the salt flux composition of an alkaline agent; and from about 3 to about 7 weight, percent, based upon the weight of the salt flux composition, of a fluoride source, the alkaline agent and fluoride source each in amounts effective for improving the recovery of aluminum in the process when the salt flux composition is mixed with molten aluminum and the alkali metal salt is present at a level of at least about 1 weight percent based upon the weight of the molten aluminum as compared to a process which utilizes a salt flux composition consisting essentially of a high purity alkali metal salt without the alkaline agent and fluoride source.

2. A process as recited in claim 1 wherein the fluoride source is selected from the group consisting of MF, $CaF_2$, $MAlF_4$, $M_3AlF_6$ and mixtures thereof where M is sodium or potassium.

3. A process as recited in claims 1 or 2 wherein the alkaline agent is selected from the group consisting of $Na_2CO_3$, NaOH, KOH, $K_2CO_3$ and mixtures thereof.

4. A process as recited in claims 1 or 2 wherein the aluminum is an aluminum is an aluminum alloy selected from the group consisting of aluminum alloy 3003, aluminum alloy 3004, aluminum alloy 5182 and mixtures thereof.

5. A process as recited in claim 3 wherein the aluminum is an aluminum is an aluminum alloy selected from the group consisting of aluminum alloy 3003, aluminum alloy 3004, aluminum alloy 5182 and mixtures thereof.

6. A process as recited in claim 1 wherein the process further includes heating the molten mixture to at least about 740° C.

7. A process as recited in claim 3 wherein the process further includes heating the molten mixture to at least about 740° C.

8. A process as recited in claim 1 wherein the salt flux composition is present in an amount of from about 1 to about 50 weight percent based upon the weight of the aluminum.

9. A process as recited in claim 3 wherein the salt flux composition is present in an amount of from about 1 to about 50 weight percent based upon the weight of the aluminum.

10. A process for the recovery of aluminum from scrap aluminum and for increasing the coalescence of aluminum during the process, the process comprising:

mixing the scrap aluminum in a solid or molten form and a salt flux composition in a solid or molten form and heating solids if they are present to provide a molten mixture, the salt flux composition consisting essentially of:

at least about 90 weight percent of an alkali metal salt selected from the group consisting of NaCl, KCl and mixtures thereof;

at least about 0.2 weight percent alkaline agent, based upon the weight of the salt flux composition, the alkaline agent being selected from the group consisting of $Na_2CO_3$, NaOH, KOH, $K_2CO_3$ and mixtures thereof; and at least about 3 weight percent fluoride source, based upon the weight of the salt flux composition, the fluoride source being selected from the group consisting of MF, $CaF_2$, $MAlF_4$, $M_3AlF_6$ and mixtures thereof where M is sodium or potassium, the alkali metal salt, the alkaline agent and fluoride source each being in relative amounts effective for improving the recovery of aluminum in the process when the salt flux composition is mixed with molten aluminum and the alkali metal salt is present at a level of at least about 1 weight percent based upon the weight of the molten aluminum as compared to a process which utilizes a salt flux composition consisting essentially of a high purity alkali metal salt without the alkaline agent and fluoride source.

11. A process as recited in claim 10 wherein the salt flux composition consists essentially of:

from about 90 to about 96.8 weight percent alkali metal salt, based upon the weight of the salt flux composition, from about 0.2 to about 3 weight percent alkaline agent, based upon the weight of the salt flux composition, and from about 3 to about 7 weight percent fluoride source, based upon the weight of the salt flux composition.

12. A process as recited in claims 10 or 11 wherein the aluminum is an aluminum is an aluminum alloy selected from the group consisting of aluminum alloy 3003, aluminum alloy 3004, aluminum alloy 5182 and mixtures thereof.

13. A process as recited in claims 10 or 11 wherein the process further includes heating the molten mixture to at least about 740° C.

14. A process as recited in claim 11 wherein the salt flux composition is present in an amount of from about 1 to about 50 weight percent based upon the weight of the aluminum.

15. A process as recited in claim 13 wherein the salt flux composition is present in an amount of from about 1 to about 50 weight percent based upon the weight of the aluminum.

16. A process for the recovery of aluminum from scrap aluminum and to increase the coalescence of molten aluminum during the process, the process comprising:

mixing the scrap aluminum in a solid or molten form and a salt flux composition in a solid or molten form and heating solids if they are present to provide a molten mixture, the salt flux composition comprising:

at least about 90 weight percent, based upon the weight of the salt flux composition, of a high purity alkali metal salt selected from the group consisting of NaCl, KCl and mixtures thereof;

at least about 0.2 weight percent, based upon the weight of the salt flux composition of an alkaline agent; and from about 3 to about 7 weight, percent, based upon the weight of the salt flux composition, of a fluoride source, the alkaline agent and fluoride source each in amounts effective for improving the recovery of aluminum in the process when the salt flux composition is mixed with molten aluminum and the alkali metal salt is present at a level of at least about 1 weight percent based upon the weight of the molten aluminum as compared to a process which utilizes a salt flux composition consisting essentially of a high purity alkali metal salt without the alkaline agent and fluoride source.

17. A process as recited in claim 16 wherein the fluoride source is selected from the group consisting of MF, $CaF_2$, $MAlF_4$, $M_3AlF_6$ and mixtures thereof where M is sodium or potassium.

18. A process as recited in claims 16 or 17 wherein the alkaline agent is selected from the group consisting of $Na_2CO_3$, NaOH, KOH, $K_2CO_3$ and mixtures thereof.

19. A process as recited in claims 16 or 17 wherein the aluminum is an aluminum is an aluminum alloy selected from the group consisting of aluminum alloy 3003, aluminum alloy 3004, aluminum alloy 5182 and mixtures thereof.

20. A process as recited in claim 18 wherein the aluminum is an aluminum is an aluminum alloy selected from the group consisting of aluminum alloy 3003, aluminum alloy 3004, aluminum 5182 and mixtures thereof.

* * * * *